United States Patent
Creswell et al.

(10) Patent No.: US 6,823,318 B1
(45) Date of Patent: Nov. 23, 2004

(54) SECURE PURCHASES OVER A COMPUTER NETWORK

(75) Inventors: Carroll W. Creswell, Basking Ridge, NJ (US); Roy Philip Weber, Bridgewater, NJ (US)

(73) Assignee: AT&T Corp., New York, NY (US)

( * ) Notice: Subject to any disclaimer, the term of this patent is extended or adjusted under 35 U.S.C. 154(b) by 565 days.

(21) Appl. No.: 09/152,810

(22) Filed: Sep. 14, 1998

(51) Int. Cl.⁷ .......................... G06F 17/60; G06F 17/00
(52) U.S. Cl. .......................................... 705/26; 705/44
(58) Field of Search .......................... 705/26, 44, 27; 380/25; 235/379; 700/237, 234

(56) References Cited

U.S. PATENT DOCUMENTS

| | | | |
|---|---|---|---|
| 5,699,528 A | | 12/1997 | Hogan .......................... 395/240 |
| 5,708,422 A | * | 1/1998 | Blonder et al. ............ 340/5.41 |
| 5,715,399 A | | 2/1998 | Bezos .......................... 395/227 |
| 5,727,163 A | | 3/1998 | Bezos .......................... 395/227 |
| 5,757,917 A | | 5/1998 | Rose et al. .................... 380/25 |
| 5,850,442 A | * | 12/1998 | Muftic .......................... 705/65 |
| 5,860,068 A | * | 1/1999 | Cook ............................ 705/26 |
| 5,984,508 A | * | 11/1999 | Hurley ........................ 700/237 |
| 6,006,200 A | * | 12/1999 | Boies et al. ................... 705/26 |
| 6,175,921 B1 | * | 1/2001 | Rosen .......................... 713/173 |
| 2001/0014878 A1 | * | 8/2001 | Mitra et al. .................... 705/39 |

OTHER PUBLICATIONS

Anderson, Ronald A. and Kumpf, Walter A., "Business Law, Uniform Commercial Code", 1969, South–Western Publishing Company, Standard Volume, Eighth Edition, pp Code–24, Code–25, Code–38, Code –39, Code–66, and Code–67.*

Daniel Minoli, Web commerce Tech Handbook, PP 21, Nov.1997.*

Daniel Minoli, Web commerce Tech Handbook, PP 21 Nov. 1997.*

* cited by examiner

*Primary Examiner*—James W. Myhre

(57) ABSTRACT

A method of purchasing an item by a purchaser includes providing an identity of the item to the purchaser over the Internet on a vendor server. The purchaser then places a telephone call over a telephone network to a billing server. During the telephone call, the billing server receives a billing amount for the item and a financial account. The billing server provides a confirmation number to the purchaser during the telephone call. The purchaser then sends the confirmation number to the vendor server. After verifying the confirmation number, the vendor sends the item to the purchaser and the vendor server sends the confirmation number to the billing server over the telephone network.

11 Claims, 2 Drawing Sheets

SECURE PURCHASES OVER A COMPUTER NETWORK

FIELD OF THE INVENTION

The present invention is directed to a computer network. More particularly, the present invention is directed to secure purchases from vendors over a computer network.

BACKGROUND OF THE INVENTION

Many products and services are available for purchase on the Internet. A popular way to make a purchase over the Internet is to send a valid credit card number to the vendor's Internet Web site. However, the Internet is not considered a secure network and is frequently subjected to incursions by computer hackers. Understandably, this has made many users hesitant to send their credit card numbers over the Internet and has limited the growth of purchases made over the Internet.

Another reason that users are hesitant to use the Internet is that vendors typically require personal information of a user (e.g., the user's name, address, phone number, etc.) before conducting a transaction. However, many users wish to remain anonymous to the vendor and also to avoid having their personal information available to computer hackers.

One known method for making purchases over the Internet without transmitting a credit card number is through the use of an electronic cash card from, for example, Mondex Corp. The electronic cash card has an embedded processor that stores a prepaid amount of money. A user can make a purchase by inserting the cash card into a specialized reader attached to the user's computer. The amount of the purchase is deducted and the vendor is reimbursed for the purchase. However, this method requires the user to have an expensive cash card and cash card reader, and sophisticated software.

Another known method is the CyberCoin service from CyberCash Corp. With the CyberCoin service, users execute specialized software to obtain an Internet wallet. The Internet wallet can be used to make payments to vendors. However, this method also requires the user to implement sophisticated software.

Based on the foregoing, there is a need for a method and apparatus for making secure purchases over a computer network such as the Internet that do not require the user to purchase and implement specialized hardware or software and allow the user to remain anonymous to the vendor.

SUMMARY OF THE INVENTION

One embodiment of the present invention is a method of purchasing an item. The present invention includes providing an identity of the item to the purchaser over the Internet on a vendor server. The purchaser then places a telephone call over a telephone network to a billing server. During the telephone call, the billing server receives a billing amount for the item and a financial account. The billing server provides a confirmation number to the purchaser during the telephone call. The purchaser then sends the confirmation number to the vendor server. After verifying the confirmation number, the vendor sends the item to the purchaser and the vendor server sends the confirmation number to the billing server over the telephone network.

The present invention allows the purchaser to purchase goods or services over the Internet using the confirmation number that is received from a billing server over the telephone network. The confirmation number itself does not divulge either sensitive credit card information or personal information about the purchaser, and therefore can be freely sent over the Internet.

DETAILED DESCRIPTION

Figure 1:
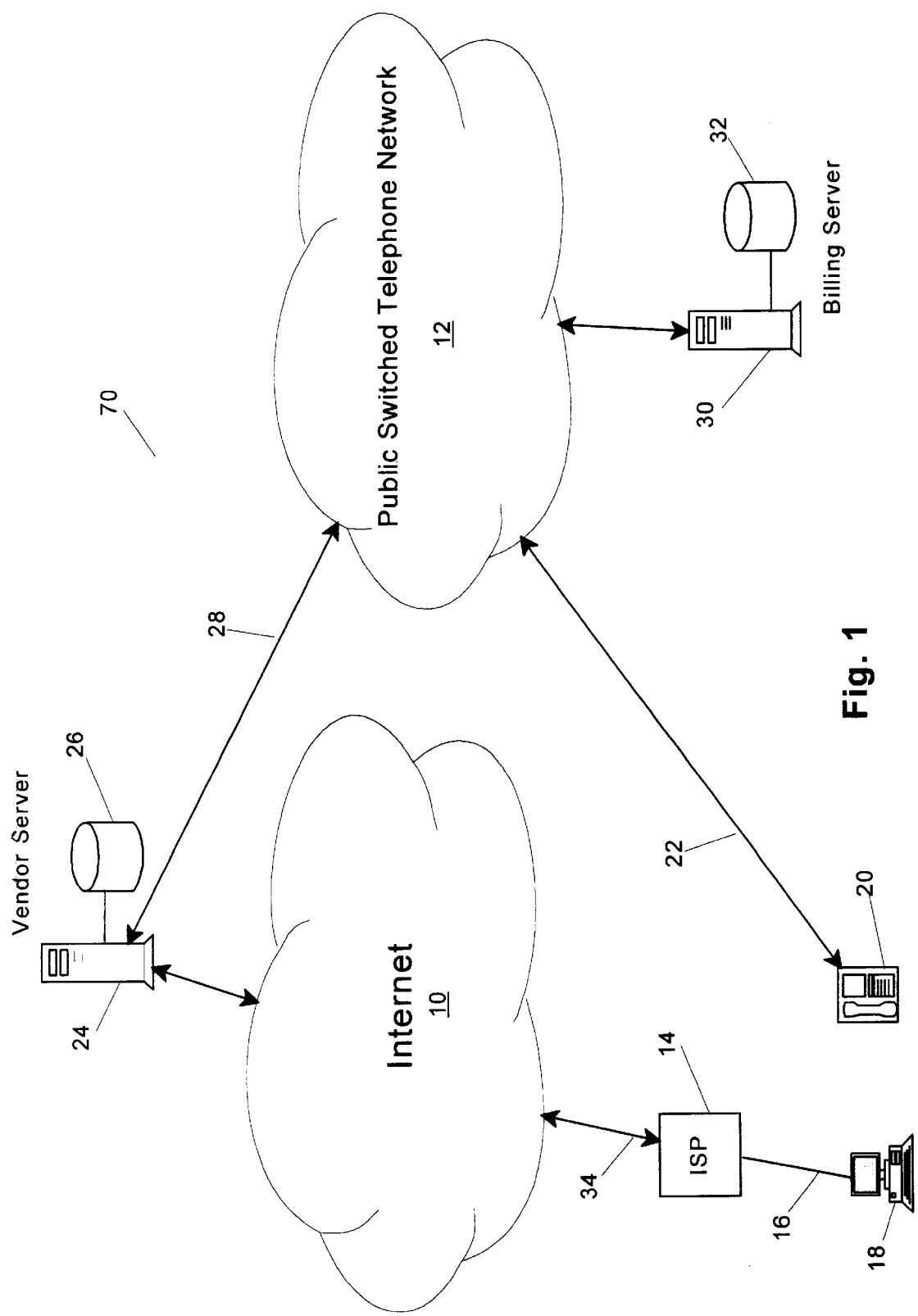
FIG. 1 is a block diagram illustrating a system for allowing secure purchases over a computer network such as the Internet in accordance with one embodiment of the present invention.

FIG. 1 is a block diagram illustrating a system for allowing secure purchases over a computer network such as the Internet in accordance with one embodiment of the present invention. The system 70 includes a computer 18 and a telephone 20 through which a user (or "purchaser") interacts to make the purchases. One embodiment of the present invention allows a user to make a purchase over the Internet with a confirmation number provided by telephone over a secure voice network.

Computer 18 is coupled to an Internet Service Provider ("ISP") 14 over a communication line 16. Communication line 16 can be a dial-up line using a modem or a dedicated communication line. ISP 14 is coupled to the Internet 10 over a communication line 34. Computer 18 can be any device that allows a user to browse the Internet. For example, computer 18 can be a personal computer, an Internet phone, or a personal data assistant ("PDA").

A vendor server 24 coupled to a database 26 functions as a Web server on the Internet 10. Vendor server 24 is a general purpose computer and includes a processor and a memory system for storing instructions executed by the processor. Vendor server 24 provides information about goods or services that are available to be purchased. The information about the goods and services are stored on database 26. A user at computer 18 can access a Web site hosted by vendor server 24 and identify a good or service to be purchased in a known manner. Because access to the Web site on vendor server 24 is through Internet 10, the security of this access is not very high and is subject to incursions by computer hackers.

A telephone 20 is coupled to a public switched telephone network ("PSTN") 12 or any other public telephone network via communication line 22 in a known manner. Because PSTN 12 is a switched circuit network, it is a secure network relative to Internet 10. Also coupled to PSTN 12 is a billing server 30 that can be dialed into by the user at telephone 20. Billing server 30 is a general purpose computer and includes a processor and a memory system for storing instructions executed by the processor. In other embodiments, network 12 may be any kind of secure network that allows telephone calls, such as a private Intranet.

Billing server 30 is coupled to a database 32 that stores information regarding the billing device that the purchaser uses with the present invention. Database 32 can be local to billing server 30, or remote from billing server 30. In one embodiment a purchaser uses a prepaid card as the billing device. The prepaid card is similar to known telephone prepaid phone cards that are prevalent. A purchaser will purchase the prepaid card, and the prepaid card will be "charged" with the amount of the purchase price. A unique identifier number will be associated with the prepaid card.

When the value of the prepaid card reaches zero, the card can either be disposed of, or "recharged" for a sum of money so it can continue to be used. When a prepaid card is used with the present invention, database 32 stores a list of prepaid cards and the dollar amount allocated to each card. Therefore, billing server 30 can easily validate a prepaid card.

In another embodiment, the purchaser uses a credit card or similar card issued by a financial institution as the billing device. In this embodiment, database 32 will also have information so that the credit card can be validated in a known manner. Database 32 may be remote from billing server 30 and controlled by the issuer of the credit card.

In one embodiment, billing server 30 is directly coupled to vendor server 24 over communication line 28. The coupling of billing server 30 to vendor server 24 is a secure link because it passes through PSTN 12 and does not pass through Internet 10. In another embodiment, billing server 30 is coupled to vendor server 24 over a secure intranet, or any other secure communication link.

Figure 2:
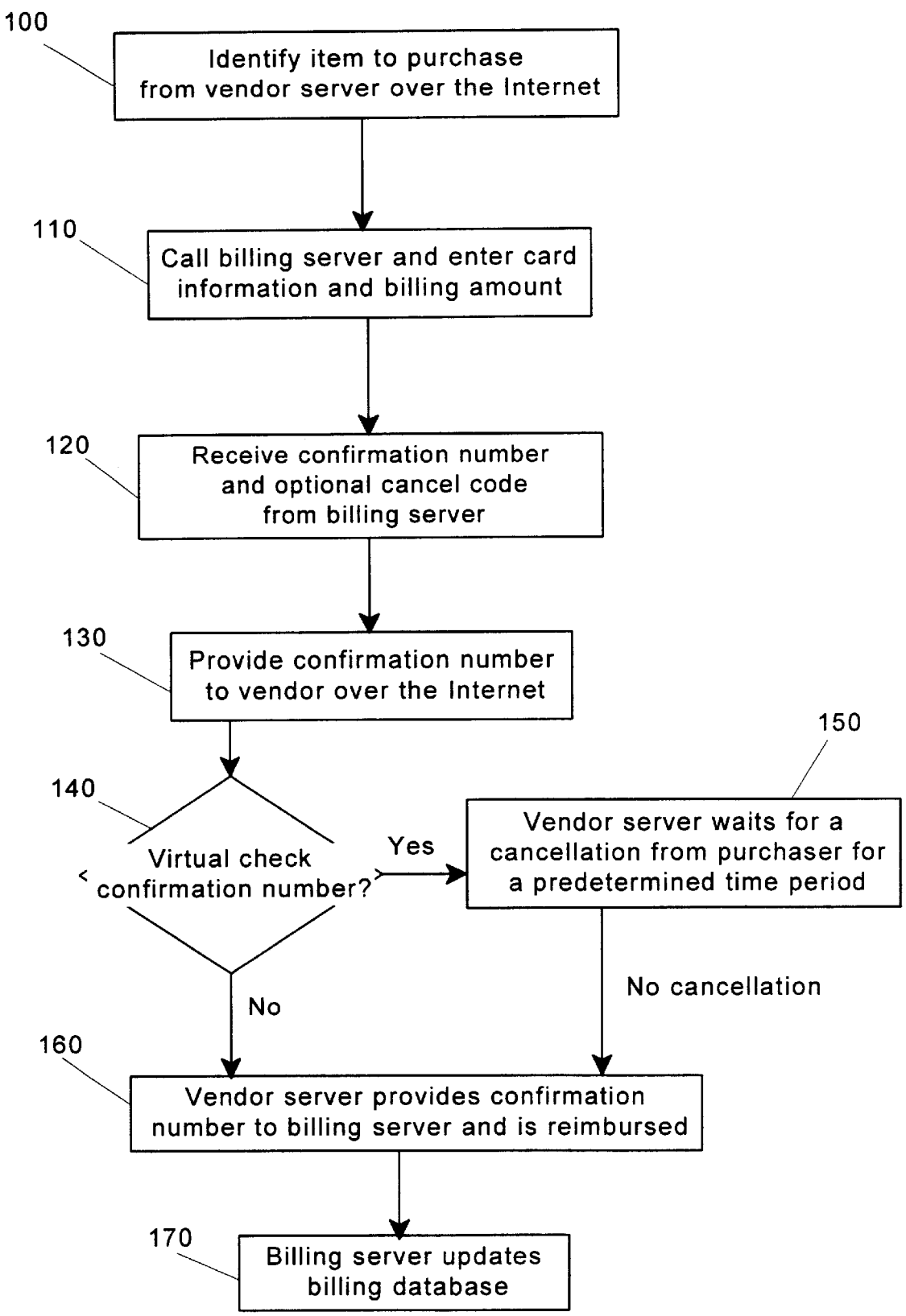
FIG. 2 is a flowchart illustrating the steps performed by the present invention that allows a purchaser to make a secure purchase over the Internet.

FIG. 2 is a flowchart illustrating the steps performed by the present invention that allow a purchaser to make a secure purchase over the Internet.

At step 100, the purchaser identifies an item to purchase over Internet 10 on a Web site hosted by vendor server 24. The purchaser accesses vendor server 24 through computer 18. The purchaser also identifies the purchase price or billing amount of the item. In one embodiment, all potential items for purchase are able to be sent to the purchaser electronically over Internet 10. Examples of the items include software, documents, music, etc. In another embodiment, a potential item may be a hard good that must be sent to the purchaser using, for example, the post office.

At step 110, the purchaser, using telephone 20, dials a telephone number associated with billing server 30. In one embodiment, the telephone number is a toll-free 800-type number. The purchaser interacts with billing server 30 when the telephone call is established. The purchaser enters identifying information for the desired billing device such as a prepaid card number or a credit card number. The purchaser also enters the billing amount or the purchase price of the desired item. In one embodiment, billing server 30 includes an interactive voice response ("IVR") system that the purchaser interacts with. In another embodiment, the purchaser enters the desired information using a touch-tone keypad on telephone 20.

At step 120, in response to receiving the card information and billing amount, billing server 30 validates the card information. If the card is validated for the desired billing amount, billing server 30 generates a confirmation number. The confirmation number is good only for this specific billing amount. In one embodiment, the confirmation number can be vendor specific, in which case the user submits the name or identification of the vendor at step 110. The confirmation number is provided to the purchaser during the telephone call.

In one embodiment, billing server 30 also provides the purchaser with a "cancel code" at step 120 if the purchaser desires a "virtual check". A virtual check allows the purchaser to cancel the electronic transaction within a predetermined time period, similar to canceling a check after submitting a check to a vendor. The cancel code received by the purchaser can later be submitted to vendor server 24 within the predetermined time period to cancel the transaction. In another embodiment, the purchaser submits the cancel code to billing server 30 to cancel the transaction.

Both the confirmation number and the cancel code generated at step 120 can be encrypted using known encryption techniques for increased security. Although billing server 30 may have some identifying information regarding the purchase, the confirmation number and cancel code do not identify the purchaser.

At step 130, the purchaser via computer 18 provides the confirmation number to vendor server 24 over Internet 10 in order to purchase the desired goods or services. In one embodiment, vendor server 24 stores a list or identities of valid confirmation numbers in database 26. In another embodiment, vendor server 24, using an algorithm, can determine whether the confirmation number is valid. In still another embodiment, vendor server 24 can query a remote server or database (e.g., billing server 30) to determine if the confirmation number is valid, using known methods to remotely validate credit card numbers. Vendor server 24 can also determine from the confirmation number the billing amount that the confirmation number represents.

Further, in one embodiment, vendor server 24 can determine from the confirmation number whether a virtual check is requested. In another embodiment, the purchaser, when sending the confirmation number to vendor server 24, can also at that time request a virtual check.

At step 140, vendor server 24 determines whether the confirmation number is associated with a virtual check. If it is, at step 150 vendor server 24 must wait the predetermined time period for a cancellation from the purchaser. In one embodiment, the predetermined time period is seven days. Therefore, if the purchaser wishes to cancel the purchase after providing the confirmation number to vendor server 24, the purchaser must send the cancel code to vendor server 24 within a seven-day period. Of course, either vendor server 24 will not provide the purchased item to the purchaser until the predetermined period has expired, or the purchaser must return the item (or delete the item if it is stored data) if the transaction is later canceled.

If within the predetermined period vendor server 24 does not receive a cancel code from the purchaser, step 160 is executed. Further, step 160 is executed if at step 140 it is determined that the confirmation number is not associated with a virtual check. At step 160, vendor server 24 provides the confirmation number received from the purchaser to billing server 30 over secure PSTN 12. Billing server 30 then arranges for vendor server 24 to be reimbursed for the billing amount associated with the confirmation number. Therefore, if the confirmation number was for $17.00, billing server 30 can electronically transmit $17.00 to vendor server 24, or reimburse the vendor at vendor server 24 some other way (e.g., send the vendor a check).

In another embodiment, instead of sending the cancel code to vendor server 24, the purchaser can send the cancel code to billing server 30 during a telephone call. Billing server 30 will then submit a cancel instruction to vendor server 24 for the corresponding transaction.

At step 170, billing server 30 updates database 32 based on the amount reimbursed to vendor server 24. Therefore, if the confirmation number was generated based on a prepaid card, the amount allocated to the prepaid card stored in database 32 will be reduced by the amount of the purchase. If the confirmation number was based on a credit card, database 32 will be modified so that the purchaser will eventually be billed by the credit card issuer based on the billing amount of the confirmation number. Billing server 30 can also directly notify the credit card issuer.

If the purchased items are hard goods and need to be delivered to the purchaser, the address of the purchaser is needed. In one embodiment, the purchaser provides this information to billing server 30 during step 110 on the secure telephone call. Vendor server 24 can then receive this information from billing server 30 over communication line 28 at a later time when the item is ready to be shipped. Therefore, the personal information of the purchaser is never transmitted over Internet 10.

In another embodiment, the purchaser's address does not ever have to be transmitted to vendor server 24, and the purchaser can remain anonymous to the vendor. In this embodiment, vendor server 24 ships the item to billing server 30. Billing server 30, which received the purchaser's address at step 110, can then reship the item to the purchaser.

In all embodiments of the present invention, confidential credit card information is not being transmitted over Internet 10. Moreover, personal information regarding the purchaser is also not transmitted over Internet 10. Any information that might be of value to computer hackers is transmitted over PSTN 12, which is considered a secure network compared to Internet 10.

As described, the present invention allows the purchaser to purchase goods or services over the Internet using a confirmation number that is received from a server over the PSTN. The confirmation number itself does not divulge either sensitive credit card information or personal information about the purchaser, and therefore can be freely sent over the Internet. Further, a virtual check function allows a purchaser to cancel an electronic purchase at a later date if the purchaser changes their mind. When prepaid cards are used, the purchaser never has to supply identification information to the vendor or the issuer of the prepaid card.

Several embodiments of the present invention are specifically illustrated and/or described herein. However, it will be appreciated that modifications and variations of the present invention are covered by the above teachings and within the purview of the appended claims without departing from the spirit and intended scope of the invention.

For example, computer 18 and telephone 20 can be combined into a single device or multiple devices, as long as the described functionality is maintained. The functionality of computer 18 and telephone 20 can also be provided by other devices, such as Internet phones and PDAs. Further, networks 10 and 12 can be any type of networks that work with the present invention, including local area networks and other private data or phone networks.

What is claimed is:

1. A method of purchasing an item by a purchaser, said method comprising:

(a) providing an identity of the item to the purchaser from a vendor server over a first network;

(b) receiving a telephone call at a billing server over a second network from the purchaser;

(c) receiving a billing amount for the item and a financial account during the telephone call;

(d) providing a confirmation number and a cancel code to the purchaser during the telephone call;

(e) receiving the confirmation number at the vendor server over the first network from the purchaser; and (f) determining at the vendor server whether the confirmation number indicates a virtual check;

(g) waiting a predetermined time before executing step (h) if the confirmation number indicates a virtual check; and (h) sending the confirmation number from the vendor server to the billing server over the second network if the cancel code is not received from the purchaser within the predetermined time.

2. The method of claim 1, wherein the first network is a packet-based data network and the second network is a circuit switched network.

3. The method of claim 2, wherein the first network is an Internet and the second network is a Public Switched Telephone Network.

4. The method of claim 1, wherein the first network is a non-secure network and the second network is a secure network.

5. The method of claim 1, wherein the financial account corresponds to a prepaid card.

6. The method of claim 1, wherein the financial account corresponds to a credit card.

7. The method of claim 1, further comprising:

validating the financial account at the billing server.

8. The method of claim 1, further comprising the step of:

(g) reimbursing the vendor server for the value.

9. The method of claim 1, wherein step (c) further comprises receiving a purchaser's address at the billing server during the telephone call, and wherein the method further comprises:

(i) sending the item to the purchaser's address.

10. The method of claim 9, wherein the item is sent from the vendor to the billing server prior to step (i), and wherein step (i) comprises sending the item from the billing server to the purchaser's address.

11. The method of claim 1, wherein the confirmation number and cancel code do not identify the purchaser.

* * * * *